US007574415B2

(12) United States Patent
Browde

(10) Patent No.: US 7,574,415 B2
(45) Date of Patent: Aug. 11, 2009

(54) PERSONAL SUPPORT INFRASTRUCTURE FOR DEVELOPMENT OF USER APPLICATIONS AND INTERFACES

(75) Inventor: Ian Browde, Soquel, CA (US)

(73) Assignee: Nokia, Inc., Irving, CA (US)

( * ) Notice: Subject to any disclaimer, the term of this patent is extended or adjusted under 35 U.S.C. 154(b) by 656 days.

(21) Appl. No.: 10/910,909

(22) Filed: Aug. 3, 2004

(65) Prior Publication Data

US 2006/0031106 A1 Feb. 9, 2006

(51) Int. Cl.
*G06N 5/02* (2006.01)
(52) U.S. Cl. ............................................. 706/48; 707/3
(58) Field of Classification Search .................... 706/48; 707/3
See application file for complete search history.

(56) References Cited

U.S. PATENT DOCUMENTS

| 6,167,564 | A | 12/2000 | Fontanna et al. | |
| 6,675,135 | B1 | 1/2004 | Murray et al. | |
| 6,678,516 | B2* | 1/2004 | Nordman et al. | 455/414.1 |
| 2003/0074342 | A1* | 4/2003 | Curtis | 707/1 |
| 2006/0053090 | A1* | 3/2006 | Cotter et al. | 707/3 |

OTHER PUBLICATIONS

"Agile Requirements Definition: A View from Requirements Engineering", by A. Eberlein, Julio Cesar Sampaio do Prado Leite, 2002, pp. 1-5.*
"A Requirements Elicitation Approach Based in Templates and Patterns", by A. Durn Toro, B. Bernrdez Jimnez, A. Ruiz Corts, M. Toro Bonilla, 1999, CiteSeer, pp. 1-13.*
Alan Davis, "The Art of Requirements Triage", pp. 1-10, can be found at www.computer.org/computer/homepage/0303/Davis/.
The Official Agile Modeling (AM) Site, pp. 1-4, can be found at www.agilemodeling.com/.
The Official Agile Modeling (AM) Site, 1 page, can be found at www.agilemodeling.com/values.htm.
Daniela Damian et al., "A Formal Knowledge Level Process Model of Requirements Engineering", pp. 1-10, can be found at www.sern.ucalgary.ca/KSI/KAW/KAW99/papers/Damien1/.
"Frequently Asked Questions about User Validation: Techniques for the Analysis of Users, Tasks, and Context of Use", pp. 1-2, can be found at www.ucc.ie/hfrg/baseline/user_task_context.html.
"Software development model", pp. 1-3, can be found at www.encyclopedia.thefreedictionary.com/Software%20development%20model.
"SE Tools Taxonomy—Requirements Generation Tools", pp. 1-3, can be found at www.incose.org/tools/tooltax/reggen_tools.html.

(Continued)

*Primary Examiner*—David R Vincent
*Assistant Examiner*—Mai T Tran
(74) *Attorney, Agent, or Firm*—Alston & Bird LLP

(57) ABSTRACT

A system and method that are directed towards developing a computer user interface employing a Personal Support Infrastructure (PSI) stack. The PSI stack is arranged to represent various layers of a human being employing a holistic approach. In one embodiment, the PSI stack may enable organization, development, and solicitation of requirements for the development of a human-machine interface, such as for a mobile device, and the like. In one embodiment, the PSI stack is configured as a data structure that may be populated with elicitations oriented towards developing the set of human-machine interface requirements.

15 Claims, 5 Drawing Sheets

OTHER PUBLICATIONS

"Project Lifecycle Models: How They Differ and When to Use Them", pp. 1-5, can be found at www.business-esolutions.com/islm.htm.

"Managing Change: Starting with Yourself (Your first-ever Business e-Coach", pp. 1-2, can be found at www.1000ventures.cm/business_guide/crosscuttings/change_yourself.html.

"Neuro Linguisting Programming (NLP)—the New Technology of Achievement", pp. 1-4, can be found at www.1000ventures.com/business_guide/crosscuttings/nsp_main.html.

"Effective Communication—the Art, Science, and Practice", pp. 1-3, can be found at www.1000ventures.com/business_guide/crosscuttings/communication_main.html.

Understanding People: Myers-Briggs Type Indicator (Your first-ever Business e-Coach), pp. 1-2, can be found at www.1000ventures.com/business_guide/crosscuttings/knowing_people_mtbi.html.

Ahmed Sidky and James Arthur, "RGML: A Markup Language for Characterizing Requirements Generation Processes", Proceedings of the 28th Annual NASA Goddard Software Engineering Workshop (SEW03), IEEE, pp. 1-10.

Markus Gröner and James D. Arthur, Confirming the Effectiveness of the Requirements Generation Model: An Industry-Based Empirical Study, IEEE, pp. 1-10.

"Volere Requirements Resources", 1 page, can be found at www.volere.co.uk/index.htm.

Rajat Sud, A Synergistic Approach to Software Requirements Generation: The Synergistic Requirements Generation Model (SRGM), and An Interactive Tool for Modeling SRGM (*it*SRGM), Thesis submitted to the Faculty of Virginia Polytechnic Institute and State University, May 2003, pp. 1-160.

Anat Grynberg et al.; *Product Management in Telecom Industry—Using Requirements Management Process*; Proceedings of the IEEE International Conference on Software, Science, Technology & Engineering; 2003; pp. 63-70.

International Search Report for PCT Application No. PCT/IB2005/001851; filed Aug. 19, 2005; Date of Completion Jul. 9, 2007; Date of Mailing Sep. 24, 2007.

Written Opinion for PCT Application No. PCT/IB2005/001851; filed Aug. 19, 2005; Date of Completion Jul. 9, 2007; Date of Mailing Sep. 24, 2007.

* cited by examiner

PERSONAL SUPPORT INFRASTRUCTURE (PSI) STACK

| | LAYERS | TEMPORAL ASPECT | |
|---|---|---|---|
| | | REAL-TIME ASPECT (Now) | VIRTUAL TIME ASPECT (Not Now) |
| 8 | SPIRIT | SOUL | SUBJECTIVE CONNECTION |
| 7 | IDENTITY | ME NOW | PROFILES, MY AGENTS, ALIASES |
| 6 | VALUES & BELIEFS | MINE | RELIGION, CULTURE, ORGANIZATION, OTHER |
| 5 | THOUGHTS & EMOTIONS | MINE | OTHERS (MASCULINE/ FEMININE) |
| 4 | TALENT & COMPETENCE | NATURAL, LEARNING | LEARNED, ACQUIRED |
| 3 | COMMUNITY & SKILLS | IN PROCESS NOW | THEORY, TOOLS, PROCESSES |
| 2 | ACTIONS & BEHAVIORS | SENSES | INTERFACES, OTHERS, THEORY |
| 1 | TECHNICAL TECHNOLOGY | VOICE, TEXT, IMAGES, TEXTURE, OSI LAYER 7 | |

*Fig. 3.*

OPEN SYSTEMS INTERCONNECTION (OSI)
REFERENCE MODEL

| 7 | Application |
| 6 | Presentation |
| 5 | Session |
| 4 | Transport |
| 3 | Network |
| 2 | Data Link |
| 1 | Physical |

PERSONAL SUPPORT INFRASTRUCTURE FOR DEVELOPMENT OF USER APPLICATIONS AND INTERFACES

FIELD OF THE INVENTION

The invention relates generally to computing interfaces, and more particularly but not exclusively to a method and system for developing computer/device user interfaces and computer/device applications employing a personal support infrastructure.

BACKGROUND OF THE INVENTION

Today, technology appears to be almost everywhere; however, with such technology has come complexity. Such complexity may arise because of the way in which the technology was designed and/or produced. For example, some computing systems may have been designed with a focus on solving a particular problem, with little or no consideration provided to how the computing system may interact, or interface, with a human. Moreover, even when the human-machine interface is considered within a set of overall requirements, such interface requirements may tend to become overwhelmed by a technologist's perspective, a cost perspective, or even a time perspective. Thus, many of today's human-machine interfaces for computing systems still include such conventional mechanisms as a graphical screen display, menu, button bar, function key, point and click, and the ubiquitous mouse. Although these mechanisms may be familiar to many, they may be improperly applied to a product, simply because the set of requirements for the human-machine interface were poorly understood.

The importance of a well-defined, effective set of requirements for human-machine interfaces is constantly being reinforced in the marketplace, as reflected by a purchaser's choice in products. Therefore, it is with respect to these considerations and others that the present invention has been made.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of the Invention which is to be read in association with the accompanying drawings, wherein:

FIG. 3 illustrates one embodiment of the Personal Support Infrastructure (PSI) stack;

DETAILED DESCRIPTION OF THE INVENTION

Figure 1:
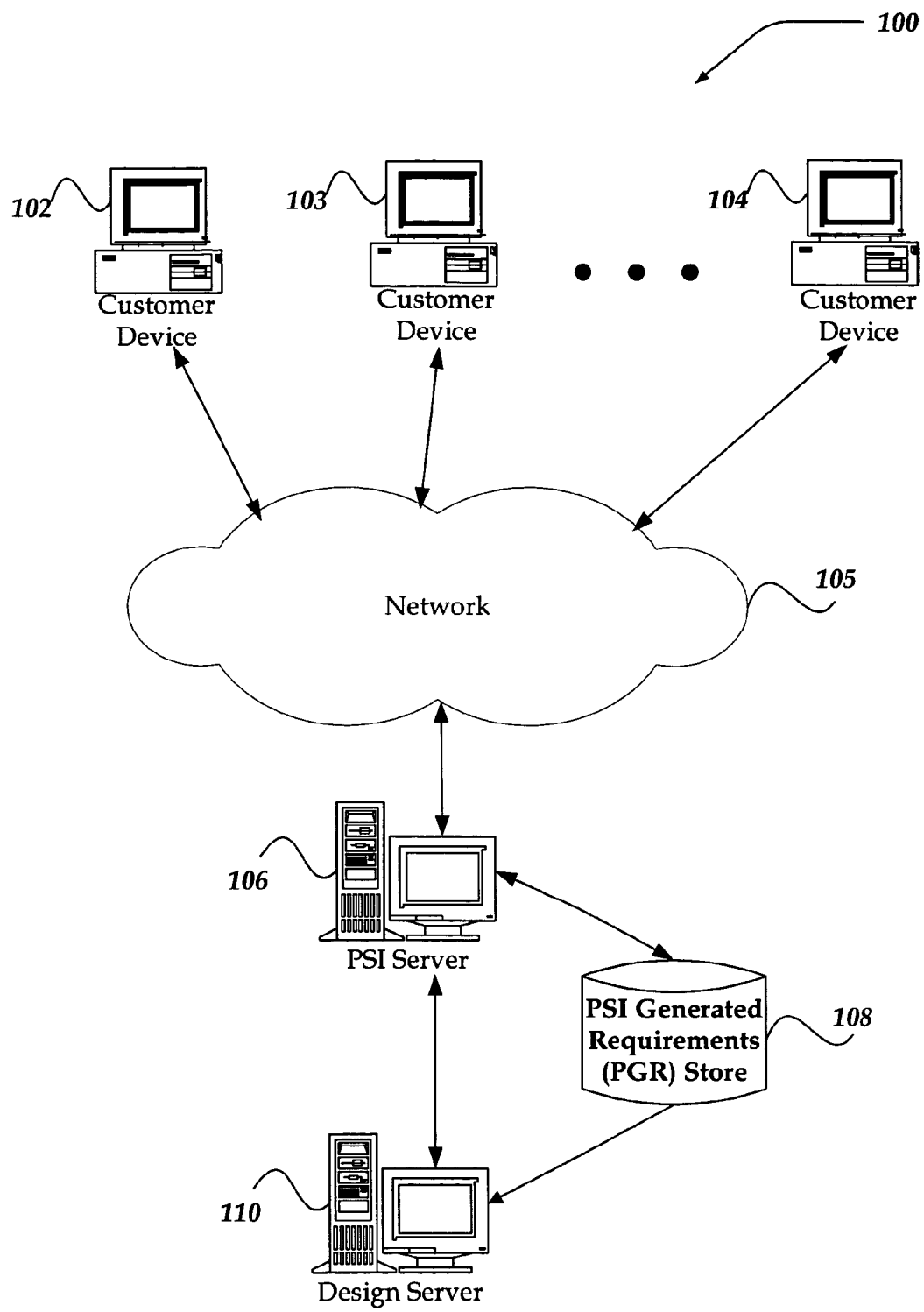
FIG. 1 shows a functional block diagram illustrating one embodiment of an environment for practicing the invention.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Briefly stated, the invention is directed towards a system and method for developing a human-machine interface, for both the actual user interface of the device itself and/or for applications contained included within/, and/or provided by it, employing a Personal Support Infrastructure (PSI) stack. Briefly, the PSI stack is directed towards representing various layers of a human being employing a holistic approach. In particular, the PSI stack may be employed within the context of organizing, developing, and eliciting a set of requirements for the development of a computer/software application user interface. In one embodiment, the PSI stack operates as a data structure that is populated with elicitations oriented towards developing the set of requirements. The PSI stack may be integrated within virtually any requirements generation process model, including, but not limited to Agile Requirements Model, Requirements Triage, Knowledge Level Process Model, Volere model, and the like.

It is contemplated that the invention may be used during a development procedure, and in particular a requirements collection and analysis phase, for virtually any product or process. The invention, for example, may be employed to enable people intending to support another in their personal practice to design and create a more relevant, appropriate, and personalized environment. However, in order to simplify the explanation, the invention will be described in the context of a simple requirements phase for a communication/computing system's human-machine interface. For example, the invention may be employed in designing a user interface for a mobile communication/computing device, such as a cellular phone, PDA, and the like.

The present invention may further be employed in development of human-machine interfaces for information banking where vaults of personal information may be created, as well as for human-machine interfaces for wireless and mobility technology, useable in measuring retention of an employee, a customer, a computing device, and the like.

Illustrative Environment

Products may be developed employing any of a variety of design lifecycle models. For example, today's software products may be developed using a top-down model, a bottom-up model, an ad-hoc model, a waterfall model, a spiral model, an evolutionary model, a chaos model, an interactive model, and similar lifecycle design mechanisms.

Moreover, in most of today's product development lifecycles, a requirements generation process is placed at the beginning. A typical requirements generation process may be composed of a variety of activities, including, but not limited to requirements elicitation, requirements analysis, requirements specification, requirements verification and validation, requirements management, and the like. Moreover, as a precursor to requirements elicitation, there may be a problem synthesis activity, wherein underlying issues may be diagnosed, prospective customer's needs and issues may be elicited, and a problem context determined.

The requirements elicitation activities may include elicitation of requirements from a customer, a prospective customer, a user, and the like. Requirements analysis may include the customer, prospective customer, user, and the like, assessing an acceptable level of risk regarding completeness, correctness, technical and cost feasibility. Requirements specification may include expressing the elicited requirements in a formal mechanism, such as a document, and the like. Requirements verification and validation activities may include presentation of the requirements to a predetermined audience for review and approval. Requirements management may include the establishment and maintenance of an agreement between a customer, prospective customer, user, and the like, regarding changes in the set of requirements.

It should be clear to virtually anyone familiar with product and/or process development that not all of the above activities need be performed. Additionally, some of the above activities may be combined, refined, deleted, embellished, and the like, without deviating from the scope or spirit of product development.

The PSI stack may be employed to provide a structure and holistic human context to virtually any of the above activities. For example, the PSI stack may be employed to develop a set of questions, tasks, questionnaires, and the like, that may be considered during the requirements elicitation activities, the problem synthesis activities, and the like. In particular, the PSI stack may be employed to develop elicitations that enable the generation of a description of how a human-machine interface should behave, and its properties, attributes, and the like. Moreover, the PSI stack may be employed to develop elicitations and other considerations during the requirements verification and validation activities. The PSI stack may also be employed during virtually any activity of a product development lifecycle, and in particular, in the development of a human-machine interface. Additionally, the PSI stack, with its feedback capture and visualization feature may be employed to continually refine, customize, and even personalize the product as the needs of the group of users, or even an individual user, changes over time. In one embodiment, the PSI stack is employable in a communication/computing system, such as described below, to develop a human-machine interface.

FIG. 1 shows a functional block diagram illustrating one embodiment of operating environment 100 in which the invention may be implemented. Operating environment 100 is only one example of a suitable operating environment and is not intended to suggest any limitation as to the scope of use or functionality of the present invention. Thus, other well-known environments and configurations may be employed without departing from the scope or spirit of the present invention.

As shown in the figure, operating environment 100 includes customer devices 102-104, network 105, Personal Support Infrastructure (PSI) server 106, PSI Generated Requirements (PGR) store 108, and design server 110. Network 105, which can be a local area network, a wide area network, the Internet, a virtual private network, or even a network of CPUs in a clustered environment internal to a single system, enables communication between PSI server 106 and customer devices 102-104. PSI server 106 is in communication with PGR store 108 and design server 110. Design server 110 is further in communication with PGR store 108. Although not illustrated, PSI server 106, PGR store 108, and design server 110 may be in communication through a network, similar to network 105.

Generally, customer devices 102-104 may include virtually any networking device capable of connecting to another computing device to send and receive information, including elicitations for requirements, responses to the elicitations, and the like. Thus, the set of devices may include devices that typically connect using a wired communications medium such as personal computers, multiprocessor systems, microprocessor-based or programmable consumer electronics, network PCs, and the like. The set of such devices may also include devices that typically connect using a wireless communications medium such as radio frequency (RF) devices, infrared (IR) devices, integrated devices combining one or more of the preceding devices, or virtually any mobile device, and the like. Similarly, customer devices 102-104 may be any device that is capable of connecting using a wired or wireless communication medium such as a portable computer, and any other device that is equipped to communicate over a wired and/or wireless communication medium.

Customer devices 102-104 may further include a client, and the like, that is configured to manage elicitations from and responses to PSI server 106. Elicitations may be received through virtually any interface mechanism, including, but not limited to a browser, an audio system, a microphone, a touch screen, a display screen and keyboard, and the like, managed by the client. Briefly, an elicitation may include any of a variety of information generated using the PSI stack, including, but not limited to interviews, questions, questionnaires, tasks in which an individual, group, and the like, engages and provides an explanation of their thought process, emotions, beliefs, and the like. In one embodiment, the client may also be configured to accommodate a feedback feature, above, that could even be associated with the elicitations themselves. The feedback feature may be employed to improve the relevance, accuracy, ease of comprehension, and the like, of the elicitations.

Network 105 is configured to couple customer devices 102-104, and the like, with each other, and to PSI server 106. Network 105 is enabled to employ any form of computer-readable media for communicating information from one electronic device to another. Also, network 105 can include the Internet in addition to Local Area Networks (LANs), Wide Area Networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Network 105 may also include CPUs in a clustered environment internal to a single system.

Network 105 may further employ a plurality of wireless access technologies including, but not limited to, 2nd (2G), 3rd (3G) and subsequent i.e., 4th, 5th and so on generation radio access for cellular systems, Wireless-LAN, Wireless Router (WR) mesh, and the like. Access technologies such as 2G, 3G, and future access networks may enable wide area coverage for mobile devices with various degrees of mobility. For example, network 105 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 105 includes any communication method by which information may travel between customer devices 102-104 and PSI server 106, and the like.

Additionally, network 105 may include communication media that typically embody computer-readable instructions, data structures, program modules, or other data in a modulated data signal such as a carrier wave, data signal, or other transport mechanism and includes any information delivery media. The terms "modulated data signal" and "carrier-wave signal" include a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, Bluetooth, and other wireless media.

PSI server 106 is described in more detail below in conjunction with FIG. 2. Briefly, however, PSI server 106 includes virtually any network device configured to employ the PSI stack to manage elicitations for consideration by a user of customer devices 102-104, and the like. As such, PSI server 106 may be implemented on a variety of computing devices including personal computers, desktop computers, multiprocessor systems, microprocessor-based devices, network PCs, servers, network appliances, mobile devices/terminals, and the like.

PSI server 106 may employ the PSI stack to provide an elicitation to the users of customer devices 102-104. PSI server 106 may receive a response to the elicitation. PSI server 106 may further employ the PSI stack to analyze the response for a requirement. The requirement may then be provided to PGR store 108, which may operate as a data store. Moreover, PSI server 106 may further provide the elicitation, and the 'raw' response to PGR store 108 for storage. As such, PGR store 108 may be configured as a database, an application, a spreadsheet, a folder, a file, and the like, for receiving, storing, and managing PSI associated information.

Figure 5:
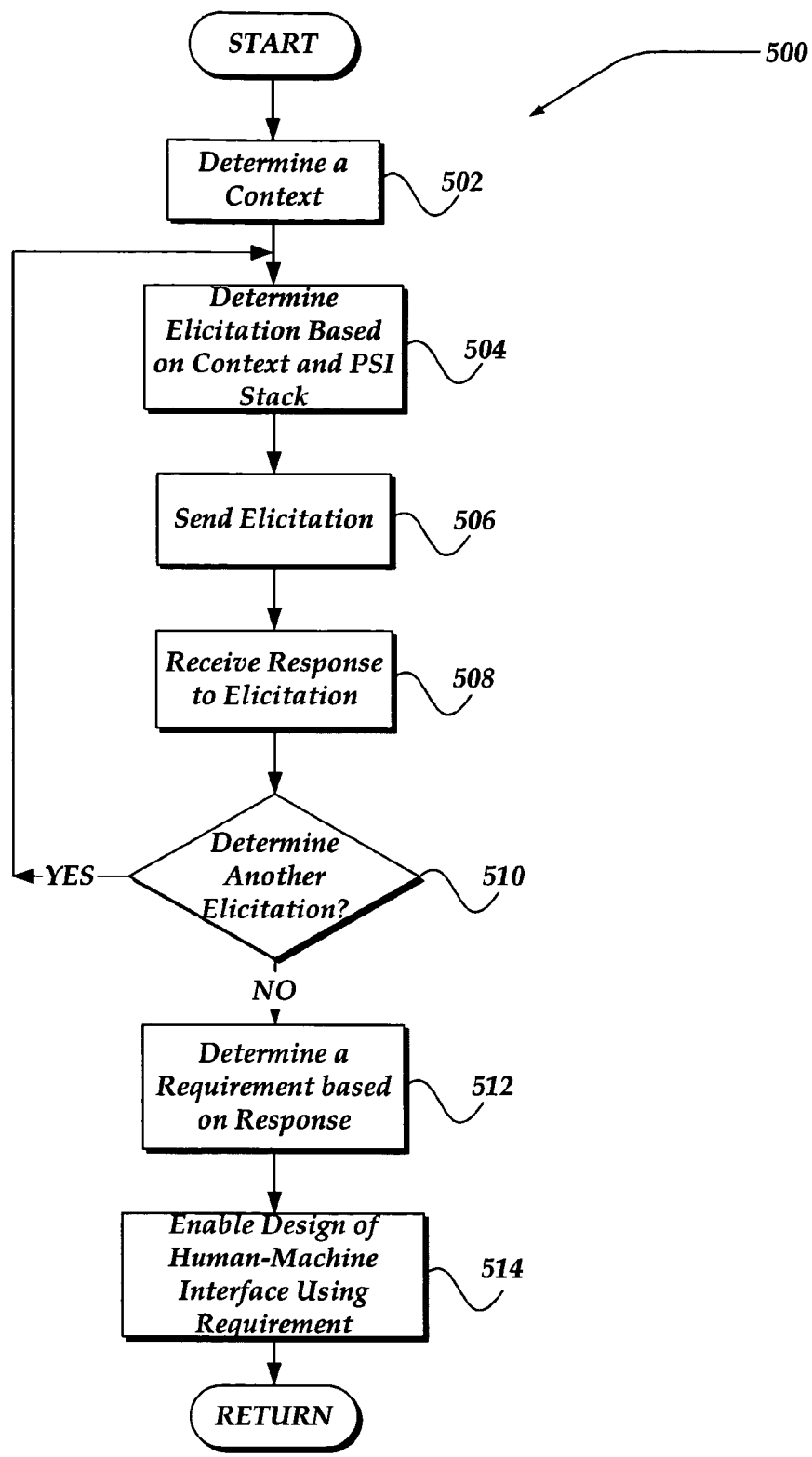
FIG. 5 illustrates a logical flow diagram generally showing one embodiment of a process for developing a human-machine interface employing a Personal Support Infrastructure, in accordance with the present invention.

PSI server 106 may further employ a process substantially similar to process 500 described below in conjunction with FIG. 5 for performing the above actions, and others, in developing elicitations and requirements for a human-machine interface employing the PSI stack.

Design server 110 may include virtually any network device that is configured to manage the design of a human-machine interface, including, but not limited to a human-machine interface applicable to mobile devices, personal information vaulting systems, computing systems, and the like. As such design server 110 may be implemented on a variety of computing devices including personal computers, desktop computers, multiprocessor systems, microprocessor-based devices, network PCs, servers, mobile devices, and the like.

Design server 110 may further include a utility, application, tool, and the like, operable to enable a designer to design a product, including, but not limited to editors, graphics tools, word processors, spreadsheets, and the like. Design server 110 may further include a development tool, application, and the like, configured to enable the designer to employ virtually any development methodology to design the product, including, but not limited to those described above. Such utilities, applications, tools, and the like, may enable the designer to receive PSI generated requirements from PGR store 108, PSI server 106, and employ the received PSI generated requirements in the developing the product, including, but not limited to the human-machine interface. Although PSI server 106, PGR store 108, and design server 110 are illustrated as distinct components, the invention is not so limited. For example, PSI server 106 and PGR store 108 may be integrated as a single component, distributed as several components, and the like. Moreover, PSI server 106, PGR store 108, and design server 110 may reside on the same network device, or be distributed across multiple network devices, beyond those currently illustrated in FIG. 1.

Illustrative Server Environment

Figure 2:
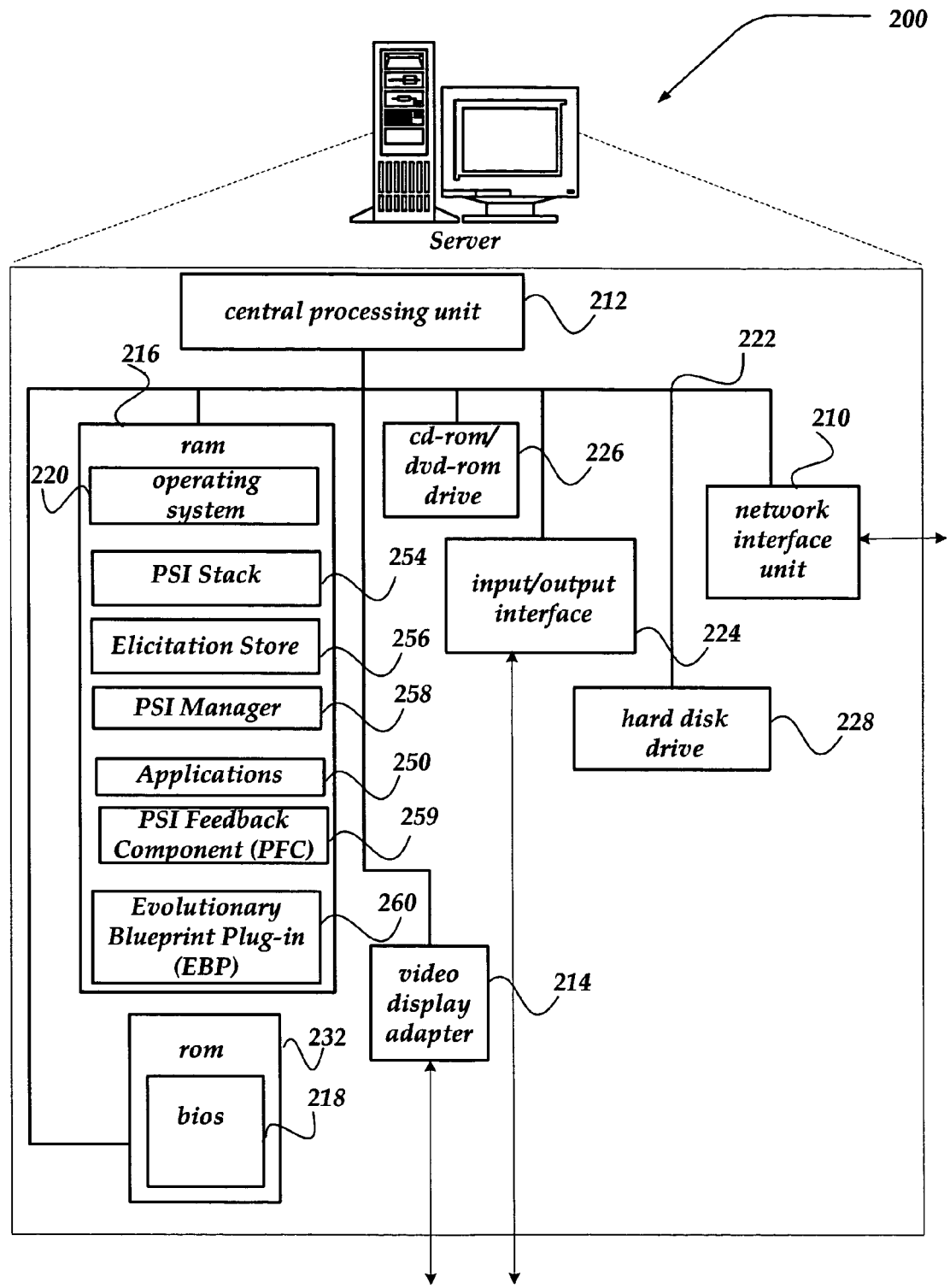
FIG. 2 shows one embodiment of a network device that may be included in a system implementing the invention.

FIG. 2 shows one embodiment of a network device, according to one embodiment of the invention. Network device 200 may include many more components than those shown. The components shown, however, are sufficient to disclose an illustrative embodiment for practicing the invention. Network device 200 may represent, for example, PSI server 106 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, such as network 105 in FIG. 1, via network interface unit 210, which is constructed for use with various communication protocols including the TCP/IP protocols. Network interface unit 210 is sometimes known as a transceiver, transceiving device, or network interface card (NIC). The connection can be via a wireline or wireless network.

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Network device 200 may also include an SMTP handler application for transmitting and receiving e-mail, an HTTP handler application for receiving and handing HTTP requests, and an HTTPS handler application or any other handler application type for handling secure connections. The HTTPS handler application or the like may initiate communication with an external application in a secure fashion. Moreover, network device 200 may further include applications that support virtually any secure connection, including but not limited to TLS, TTLS, EAP, SSL, IPSec, and the like.

Network device 200 also includes input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 may be utilized to store, among other things, application programs, databases, client device information, policy, security information including, but not limited to certificates, ciphers, passwords, and the like.

The mass memory also stores program code and data. One or more applications 250 are loaded into mass memory and run on operating system 220. Examples of application programs may include transcoders, schedulers, graphics programs, database programs, word processing programs, HTTP programs, project management programs, and so forth. Mass storage may further include applications such as PSI manager 258, elicitation store 256, PSI stack 254, PSI Feedback Component (PFC) 259 and the Evolutionary Blueprint Plug-in (EBP) 260.

PFC 259 may include both a feedback capture capability (in virtually any medium, including but not limited to text, image, voice, and the like) and a feedback presentation capability. This may enable a user of any device, in this example customer devices 102-104, to give feedback about any or all aspects of the product, interface, process they may be employing. It also may enable a PSI server operator to present, view, listen, and the like, to the feedback in relationship to the product and make one or a number of determinations regarding the feedback. For example, if the feedback represents a group of people, it can be weighed by priority, urgency, popularity of request, and so forth. It can also be assessed for cost of implementation in relation to demand and the like. In the event of the feedback coming from an individual user, it can be weighed in relation to need (say for example, a person who is visually challenged requests significantly larger font sizes on their screen as a default) and in relation to cost. PFC 259 may thus be used in improving the elicitations themselves or the product, interface and the like.

EBP 260 represents a capture and improvement component for group support infrastructures such as Enterprise Blueprints, IT architectures, and the like, designed to an organization's support workers at virtually any layer of an organization. EBP 260 may be implemented as a flash-based application configured to perform similar actions to PFC 259, but also to relate directly to the Enterprise Blueprint, and the like, and to enable it to evolve over time to an ever more granular and personal focus for its constituents and those who are designing and implementing the supportive infrastructures for them.

PSI stack 254 is described in more detail in conjunction with FIG. 3. Briefly, however, PSI stack 254 employs layers to represent a human being. The layers may be employed collectively, or selectively, to develop elicitations useable in creating personalized support infrastructures for individuals or groups of individuals in Communities of Practice (CoP). CoPs may include the way workers (anywhere) may organize themselves to accomplish what they need to do. For example, as stated in Communities of Practice, Etienne Wenger, Cambridge University Press, 1998. "No matter what their official job description may be, they [workers] create a practice to do what needs to be done."

Figure 4:
FIG. 4 illustrates one embodiment of the Open Systems Interconnection (OSI) Reference Model.

PSI stack 254 may employ an Open Systems Interconnection (OSI) layer reference model, as described in conjunction with FIG. 4, with layer 7 of the OSI stack as its layer 1. However, PSI stack 254 is not so limited, and may employ virtually any other electronic technology reference model, or non-electronic technology reference model, including, but not limited to, the Internet TCP/IP model, the Ferris wheel, the step-ladder, and the like.

Elicitation store 256 may include virtually any mechanism for storing and managing an elicitation. As such, elicitation store 256 may be implemented as a database, a spreadsheet, a program, a document, a folder, a file, and the like.

PSI manager 258 is configured to employ PSI stack 254 to generate and manage an elicitation for use in developing requirements for a supportive infrastructure, including, but not limited to a computing system, a network, a mobile device (e.g., mobile phone), television, radio, fax machine, and the like, that employs a human-machine interface. Such supportive infrastructures, however, are not limited to computing based infrastructures, and interfaces. For example, PSI manager 258 may be employed to develop requirements for automobiles, shoes, chairs, telephones, information management infrastructures, customer service processes, doctor-patient meetings, attorney-client interviews, and virtually any other personalized infrastructures having human interfaces.

PSI manager 258 may also receive a context in which to develop the elicitations from virtually any source, including, but not limited to, a designer, a user, prospective customer, a customer, an existing design, product, and the like. The context may include a variety of information including, a description of an environment in which the machine-interface is to be employed, a description of a problem, an expectation, and the like. Moreover, the context may include information associated with who may use the product, what they might do with it, when they may use it, and where they might use it. In one embodiment, PSI stack 254 may be employed to develop the context itself. For example, where PSI stack 254 has contributed to a particular design in a particular context, an inventor may recognize that the very introduction of the new design could contribute to a changing of the context such that a new design may become necessary. Thus, the inclusion of the feedback feature and functionality enhances this recognition. An example of this might be the introduction of Mobility technology to a company where workers are empowered to conduct conference calls anywhere, any time. This context creates the need to enable people to speak in public on the phones without disturbing others or enabling others to overhear their conversations should then be confidential. Elicitations of people in this context might thus precipitate the need for sensitivity microphones, voice distribution "silencers," and the like.

PSI manager 258 may enable the generation of elicitations in virtually any form, including, but not limited to interviews, questions, questionnaires, tasks in which an individual, or group, and the like, engages and provides an explanation of their actions, thoughts, emotions, values, beliefs, and the like. In one embodiment, a data structure may be employed to provide the elicitations. In that embodiment, the data structure may comprise at least one layer from the PSI stack. Moreover, PSI manager 258 may store the generated elicitations in elicitation store 256. These elicitations now become a rich store of distinctions that may be categorized for use in similar environments in the future as well as leveraged as the basis for elicitations in other environments with certain similarities.

PSI manager 258 may further provide the generated elicitations to a customer, user, prospective customer, designer, manager, and the like. PSI manager 258 may further receive a response and provide the response to a data store, such as PGR store 108 of FIG. 1. PSI manager 258 may also determine a requirement from the response and provide the requirement to the data store. PSI manager 258 may employ a process, such as described below in conjunction with FIG. 5, to perform the actions above, as well as other actions.

Illustrative Personal Support Infrastructure Stack

The PSI stack is configured to enable developers to design and create more relevant, appropriate, and personalized environments for those users being supported. This may be accomplished by enhancing the developer's focus, organization, and intimacy with actual, ever-changing need(s) of those users being supported. When employed by the designer, the PSI stack may enable an improved understanding of a human being's use of a machine, a need, anticipated or unanticipated, for the machine, the human being's current and potential understanding of the machine, a potential and actual purpose of the machine, and a circumstance in which the human being may employ the machine and an interface to the machine.

FIG. 3 illustrates one embodiment of Personal Support Infrastructure (PSI) stack 300. PSI stack 300 may include many more components than those shown. The components shown, however, are sufficient to disclose an illustrative embodiment for practicing the invention. PSI stack 300 may represent, for example, PSI stack 254 of FIG. 2. As shown in the figure, PSI stack 300 includes eight layers 302, and temporal aspect or dimension 304.

Layers 302 include, technical technology as layer 1 (this layer may be commensurate with layer 7 of the OSI stack, above), actions and behaviors as layer 2, community and skills as layer 3, talent and competence as layer 4, thoughts and emotions as layer 5, values and beliefs as layer 6, identity as layer 7, and spirit as layer 8.

As shown in the figure, each of the layers 302 may be viewed to include at least two temporal aspects, real-time aspect 306 and virtual time aspect 308. That is, a human being may be represented as 'existing' in real-time, the present, or "now." The human being may also be represented as 'existing' in a time that is "not-now." For example, the inventor's assertion may be that human beings live their lives in the "now" e.g., reality, although much of the now experience may be contextualized by the "not now" e.g., paraphrases, inferences, concepts, perceptions of reality.

Such virtual time includes the past, a summation of past components (actual, fantasized, and the like), the future (as may be viewed in terms of plans, expectations, intentions, hopes, desires, and the like). Thus, in designing a human-machine interface it may be appropriate to include elicitations around temporal aspects of a use context, and the like, for the human-machine interface. For example, in the context of using a mobile device, a temporal elicitation may include questions associated with storage of information for future viewing, and the like. As seen in FIG. 3, such temporal elicitations may become more focused based on the particular PSI layer being considered.

An example of this might be as follows: two human beings using the same Mobile device to view the same "live" event, such as a football contest, and both supporters of the same team might have totally different reactions to the team they are supporting scoring points. Therefore, this may require different capabilities of the device at the time of viewing. The individual reactions while occurring in real-time may be actually paraphrases of what is happening due to their distance from the event, the technology mediating their view, their cultural background, their values and beliefs, and so forth. Thus the one person may react by saying "we are the best. I know we are going to beat them." Whereas the other person might react to the same event by saying "that was well executed. I think they might actually win this game." Eliciting the different reactions to a sports event might then provide the designer of the device with information that would provide the former fan-type with a direct ability to communicate verbally to the team on the field through loudspeakers while the second fan-type might be afforded a capability of entering a text message that would generate scoreboard representations of their reactions.

Layers 302 are configured to provide a vision of a human being that may be employed in developing human-machine interfaces, and the like. As may be seen by the various layers, a human being may be viewed within a context of an individual, as a community of practice, a community of interest, a community of various combinations of layers of PSI stack 302, and the like, each of which may relate to another through information. Such information may be obtained from a representative human being through development of elicitations that consider at least one of layers 302, along with at least one temporal aspect 304 within the selected layer(s).

Technical technology layer 1 of layers 302 represents a layer in which the machine 'world' gets closest to a soft side of a human being i.e. the side represented by layers 2-8 of the PSI stack. It includes, for example, those aspects of human beings such as audio, tactile, and the like, as applied through the machine. Thus, it may include an application layer interface, a sound system, a keyboard, a screen interface, graphics, voice, text, texture displays, and the like. In one embodiment, the technical technology layer is represented by layer 7 of the Open Systems Interconnection (OSI) Reference Model, as described in more detail below in conjunction with FIG. 4. However, the invention is not so limited, and virtually any reference model, taxonomy, and the like, that represents the machine layer may be implemented, including, but not limited to the Internet TCP/IP Model, the Ferris wheel, the stepladder, Maslow's hierarchy of needs, and the like.

Through the course of discussing FIG. 3, a common example will be used for designing a Mobile Device aimed at reaching a particular market. In the example, the Silver Nomads represent a population over the age of 55 years who typically travel a lot, are typically well educated, and may have large networks of friends and colleagues with whom they may stay in touch frequently on various topics.

The technical technology layer 1 of layers 302 may be employed to enable a designer to consider available and potential machine interfaces when developing elicitations applicable for designing human-machine interfaces. For example, where the designer's context includes employing a mobile device during a person's commute to/from work, or traveling around, a technical technology layer elicitation may include questions pertaining to the characteristics of a mobile device, including, but not limited to its screen capabilities, audio capabilities, and the like. Examples of elicitations may include: "Is the ability for large fonts important to you? If so, how large would you like the font to be 12, 14, 18, 24 point?"; "Is it important for you to be able to put the sound up higher than the normal volume range for mobile devices (phones)?"; and "Would you like the sound to be more like a radio or CD/DVD player?" Note that these examples are aimed at designing for an audience of people over the age of 55 where vision and hearing are usually being challenged if not impaired. Other examples/elicitations may be generated, and these examples are not intended to constrain the possible elicitations in any manner.

The actions and behaviors layer 2 of layers 302 represents a layer that is directed towards considerations of how a human may act or behave. In the real-time aspect, this may include, but is not limited to, a human being's touch, smell, sight, taste, motion, and sound senses. An elicitation that may be considered in, for example, the mobile device context, may include what senses the human being may employ to interact with the mobile device. Specific elicitations here might be e.g. "Which sense is your strongest, hearing, sight, smell, touch? Is that the sense you would most like to use in your interaction with your Mobile device? If not which sense would you most prefer to use? Why would you prefer this sense?"

In the virtual time aspect or dimension, this may relate to actions and behaviors of others to which a person might react (positively or negatively), human-machine interfaces which may have been designed to induce or elicit certain behaviors and which may influence or persuade people to act or behave in various ways. This may also include interfaces, such as AI-types, that were being designed to respond with actions (smiles, frowns, and so forth) or behaviors (shouts, cries, laughs, and so forth). It might also include interactions with people relating to not now actions such as storing/archiving information, recording calls or sessions, and the like. For example, in a mobile device, a designer may consider developing an elicitation that seeks responses around how one may wish to have the mobile device store and retrieve information for use at some other time. Specific elicitations here might include: Would you like your Mobile device to respond to you verbally or not? If so, would you like the response to be polite or rude? If rude would you like that to be rude in a humorous way or a serious way? If humorous, what type of humor do you prefer sarcasm, dry wit, bathroom/vulgar, cute elementary, etc.?

The community and skills layer 3 of layers 302 may be employed to enable the designer to consider a community in which the human being resides (in both real and virtual time aspects). A distinction between real-time (now) and not real-time (not now) includes between those communities that are in process right now and those that are either historical or potential and between those skills that are being used right now and those that are theoretical or the tools for such skills. Examples of the distinction between real-time and not real-time communities may include the difference between the Community of Practice (CoP) in which a person is currently functioning like an insurance adjuster, a baseball batting coach, a ballet/dance instructor, an assistant professor in the liberal arts, and the like, versus the CoP in which a person might find themselves in a future like an eco-composter, a clean water worker, a peace pro-activist and the like. On the skills level this might be the difference between the skill of public speaking versus the skill of dialogue facilitation and the like or tools such as Korzybski's ladder (also sometimes referred to as the ladder of Inference), and the like. Such considerations may include elicitations that attempt to understand how the human being exists in relationship to others. Such elicitations may also consider use of mobile device within various community situations, including, but not limited to, driving, meetings, social functions, and the like. Specific elicitations might include: Would you like your Mobile device to have more profile alternatives built in to it other than the current normal, silent, meeting, outdoor? If yes, what community contextual profiles might you be interested in? Would you like special ring tones for those engagements? If so, would you like musical ring tones? If so what sort of music would you prefer classical, jazz, rock and roll (50s, 60s, 70s, 80s, 90s) C&W, blues, rap, etc? Do you have special artists that you prefer like the Beatles, Bob Dylan, and the like? As far as skills are concerned, elicitations might be like would you like your mobile device to support your ability to produce more balanced conversations? If yes, do you understand a balanced conversation to be a balance of advocacy and inquiry? If not what do you consider balance? If yes, would that include coaching on demand or would you prefer scenario-based help? Additionally, skills within the community and skills layer 3 of layers 302 is directed towards enabling the designer to develop elicitations that seek an understanding of the human being's ability to use knowledge effectively and readily in the execution and/or performance of a task. In the mobile device example, an example elicitation may include questions, surveys, studies, and the like, pertaining to a human being's developed aptitude or ability to manage multiple activities, such as driving a vehicle and communicating over the mobile device. Specific elicitations might include: When you drive would you prefer that your mobile device sense that you are driving and take messages automatically thus is preventing you from driving and talking on the phone? Would you prefer a Mobile device that is built in to the car and is automatically on speaker phone with only a limited number of numbers accessible such as emergency, home, and the like?

The talent and competence layer 4 of layers 302 is directed towards enabling the designer to consider aspects of the human being that may include one's talents and competencies. Elicitations that consider talent may seek to understand a natural endowment of the human being, while elicitations considering competence may seek an understanding pertaining to ability that has been acquired through learning whether via general life experience or specific situational experience that includes training, coaching, tutoring, education, and the like. Note that the distinction between skill and competence is similar to the distinction between strategy and tactic conceptually. Skills may include the abilities applied to specific tasks, whereas competencies may be more generalized abilities that can manifest in multiple skills i.e., applications to multiple tasks. In the Silver Nomads mobile device example, an example elicitation around talent may include questions, surveys, studies, and the like, pertaining to a human being's natural ability to communicate verbally. Specific elicitations might include: When you communicate verbally do you always speak at the same volume? Would you prefer a Mobile device that is able to sense your volume levels and moderate them so as to ensure your remote audience does not continually have to adjust the volumes on their devices? Or would you prefer immediate feedback from your device when your voice volume exceeds a certain level that you have pre-set so you can self-moderate or modulate your voice? If the latter, would you prefer a vibration to indicate your need to modulate or would you prefer a flashing light?

An example elicitation around competence may include questions, surveys, studies, and the like, pertaining to a human being's learned ability to communicate in various languages. Specific elicitations might include: When you communicate with others do you require vocabulary support in different languages? Would you prefer a Mobile device that is able to provide you with multiple language dictionary support? If so, which languages would you prefer? In those languages would you prefer audio support so the pronunciation is also made clear or would you merely want or phrase to show up as text? If you want audio support, would you prefer a male or female voice? Would you prefer a young person's voice or an older person's voice?

The thoughts and emotions layer 5 of layers 302 is configured to enable the designer to consider aspects of the human being that may include a reasoning power (thoughts) and an affective aspect of consciousness (emotions) within a predetermined context, and the like. For example, elicitations seeking an understanding of the human being's thoughts would need to discover whether a person was primarily an inductive thinker (from the specific to the general i.e. Aristotelian), or a deductive thinker (from the general to the specific i.e., Platonic). Also, the elicitations may consider whether a person was predominantly an analytical, often termed "left-brain," thinker or an intuitive, often termed "right-brain," thinker. In the Silver Nomads mobile device example, an example elicitation around thoughts may include questions, surveys, studies, and the like, pertaining to a human being's way of thinking when they are using the device. Specific elicitations might include: When you use your Mobile device do you prefer to see pictures/images or text when you communicate? If pictures, would you prefer those that communicate with you have a store of images that you like transferred to them automatically so they can use them to communicate with you more effectively? Do you prefer to hear the conclusion first and then the reasoning behind it? If so, would you want that preference communicated to everyone with whom you are communicating or only certain types of people? If only certain types, could you be more specific: salespeople, legal people, businesspeople, etc?

Elicitations about emotions regarding the use of the mobile device may include questions, studies, surveys, and the like, about the distinctions between feminine and masculine affect. In short, all human beings are located somewhere along the spectrum of masculine-masculine and feminine-feminine in how they feel about the myriad aspects of their lives. This location can change over time too. So, a person who experiences their emotions as a masculine in their teens, twenties, and even thirties can become a feminine-masculine in their later years. An example elicitation around emotions may include questions, surveys, studies, and the like, pertaining to a human being's way of feeling about the device itself. Specific elicitations might include: Would you feel better using a landscape/horizontal mobile device or a portrait/vertical one? Do you feel better with rounded edges or sharper edges? Which colors do you prefer dark shades or light shades, bright colors or sedate colors? Would you like to be able to choose a specific color for your mobile device? If the only color available were gun-metal gray how would you feel about your device? If the only color available were pink, how would you feel about your device?

The values and beliefs layer 6 of layers 302 is configured to enable the designer to consider aspects of the human being that may include a code of conduct, ethics, superstition, and the like. Within this layer, an elicitation may seek to improve the designer's understanding, for example, of which aspect of the mobile device is more important than another. This level of distinction can be very confusing since many people, in fact entire cultures, often perceive values and beliefs to be fundamental to who they are and thus do not distinguish between identity and values and beliefs. So, for example, in the Western world for many generations people assumed that rationality is who we are rather than a system of belief. Therefore, when designing a mobile device for people who grew up in another belief system where, for example, ambiguity is an alternative to rationality, there may be design characteristics that suggest themselves which would not get any traction in the West. Also, for example, as one ages, it appears that things that were "black and white" at 18 or 28 may become more "shades of grey" at 58 or 68. Also, different religions may have different rules or even different approaches to rules. Understanding these distinctions and hence the preferences they might generate amongst users/interactors is vital for designers of products, processes and applications. In some cultures it is far more acceptable for people to be interrupted by a phone than in others. It might be very helpful for example to have a capability of a phone to be "told" I am going to XYZ country and for the device to "know" whether it should be adjusting to the mores of that environment or not.

An example elicitation around values and beliefs may include questions, surveys, studies, and the like, pertaining to a human being's beliefs about technology itself. Specific elicitations might include: Do you believe that your mobile device should conform to your way of doing things or the other way round? If the former, would you prefer a device that understands where you are so it can adjust to the sensitivity of your situation? If yes, would you like to be able to tell your device when you pray so that during those times it goes into silent mode? If yes, do you want this to occur daily or weekly? If daily, would you prefer that to happen once, twice, three, four, five times a day or more?

The identity layer 7 of layers 302 is configured to enable the designer to consider aspects of how human beings may "see themselves" in the machine, in use with the machine, with an intent of using the machine, and the like. This is also aimed at the understanding that a person can have many identities or personas for which their interfaces will need to cater. So, at the deepest level a person may be growing into a deeper and deeper understanding of who they are, what their likes and dislikes are, what their values and beliefs are, what they need to feel secure, comfortable, fulfilled and the like. At other levels, they may differentiate between identities for multiple reasons. So, one identity may be the identity that participates in a fantasy sports league, another may be the identity that acts as grandparent to one or more grandchildren while yet another may be the director of, consultant to or advisor for a company of some description. Each of these identities shares some features with the others while having many attributes that are not just different but must be kept separate. At the deepest level, elicitations may seek to improve an understanding of who the human being is with respect to the machine, how the machine extends a sense of self, and similar questions related to a distinguishing character, personality, and the like, of the human being.

An example elicitation, in keeping with the Silver Nomad focus, around identity may include questions, surveys, studies, and the like, pertaining to a human being's grandparent identity and how that would be catered to by the Mobile device. Specific elicitations might include: How many grandchildren do you have? What is their age range? Would you be communicating with all of them? Are they boys or girls, men or women or both? If both and across a broad range of ages, would you want the ability to communicate with each of them individually? If so, would you want a specific ring associated with each grandchild? Would you like a specific storage capacity associated with each grandchild and accessible to you at will? Would you want to be able to have a special answering capability for your grandchildren if you are otherwise occupied or would going to your regular voicemail be sufficient? If a special answering capability were required would you want different messages for different phone access numbers?

The eighth layer of layers 302 is configured to enable the designer to consider aspects of how the machine affects the human being's relationship to an animating or vital principle that may provide the human being a sense of connection to eternity. This eighth layer is intended to create/recognize a space for people to create, and extends beyond the confines of a self and/or organized thought, organized relationship, and the like, with nature, universe, God, Allah, Jehovah, or any other creative force, creator, or so forth.

The real-time aspect includes the temporal relationship of a soul, or an objective connection between a living individual and a natural order. The virtual time aspect includes a subjective connection or that connection an individual may think, know, perceive, feel, and so forth, that they may have with a natural order.

The intent at this layer is really to give the designer of the product or application interaction a deep understanding of who the real human beings are that they are trying to satisfy. Elicitations at this layer are less oriented to specific deliverables than to an overall sense of who the real customer/user is. Although they could have implications for components, designs, colors, and so on.

An example elicitation, in keeping with the Silver Nomad focus, around Spirit may include questions, surveys, studies, and the like, pertaining to a human being's relationship to the environment and how that would be catered to by the Mobile device. Specific elicitations might include: Do you relate to the environment in a special way? If so, can you respond to some of the following questions and also give an idea of your relationship where the questions are not comprehensive enough? Do human beings have dominion over the earth or the other way around? Would you prefer that the products you use where possible contain only materials that are recyclable? Would you want documented proof of this from the company from whom you are buying? Would having recyclable components in the product be more important to you than the price of the device? Would you want to know that a part of the cost of your device was going to some philanthropic cause in the world? If so, would you prefer to be able to designate which cause? If so, what sorts of causes would you choose? What sort of proof would you want from the producer of the device to satisfy your demands?

As described above, PSI stack 300 is arranged to enable the designer to consider the human being holistically within a predetermined context. The designer may employ all of layers 302, when considering the human-machine interface. However, PSI stack 300 is not so limiting, and, the designer may select to employ a subset of layers 302 when considering the human-machine interface, without departing from the scope or spirit of the invention.

Moreover, although PSI stack 300 is illustrated as a layered construct, the invention is not so limited. For example, PSI stack 300 may be arranged in a circular configuration, a prism configuration, and the like, without departing from the scope of the invention. For example, in one embodiment, PSI stack 300 is configured as a data structure, wherein each 'layer' comprises a data field of the data structure that may be populated with one or more elicitations associated with seeking an understanding of that aspect of the human being. Furthermore, each data field may further comprise a temporal aspect data field representing at least one of a real-time aspect and a virtual time aspect.

FIG. 4 illustrates one embodiment of the Open Systems Interconnection (OSI) Reference Model 400. OSI Reference Model 400 may include many more components than those shown. The components shown, however, are sufficient to disclose an illustrative embodiment for practicing the invention. OSI Reference Model 400 may represent, for example, layer 1 of PSI stack 300 of FIG. 3.

As illustrated, OSI Reference Model 400 includes seven layers: a physical layer, a data link layer, a network layer, a transport layer, a session layer, a presentation layer, and an application layer.

Briefly, the physical layer is concerned with a network transmission medium and its associated physical interfaces for the computing system. The data link layer may operate on a bit-stream service provided by the physical layer, to group the bits and manage their flow control. The network layer may extend the services of the data link layer by providing a means to deliver data across not only local networks, but also neighboring and distant layers. The transport layer is directed toward a computing network system's higher-level tasks not directly related to end-to-end delivery of data, such as multiplexing, and the like. The session layer may provide services that may determine how data is exchanged in an end-to-end communications dialog. The presentation layer may hide a difference in data representation that may vary from one computing network system to another. The application layer is directed towards consuming services from the lower layers through Application Programming Interfaces (APIs), and the like, that may provide programmatic access to services like file transfer, messaging, printing, and the like.

Illustrative Operation

The operation of certain aspects of the present invention will now be described with respect to FIG. 5. FIG. 5 illustrates a logical flow diagram generally showing one embodiment of a process for developing a human-machine interface employing a Personal Support Infrastructure, in accordance with the present invention. Process 500 of FIG. 5 may be implemented within PSI server 106.

Process 500 begins, after a start block, at block 502, where a context for the human-machine interface is determined. Determination of the context may include, but is not limited to, a circumstance in which the machine may be employed, by whom, where, when, and the like. In one embodiment of the invention, determination of the context may include determination of a potential customer, a customer, a user, and the like, in which the design may be employed. For example, the context may be a Silver Nomad, a woman over the age of 65, who loves music using a particular device in an automobile.

Processing next proceeds to block 504, where a PSI stack such as described above in conjunction with FIG. 3 is employed to develop at least one elicitation. In determining at least one elicitation, every layer of the PSI stack may be employed, a sub-set of layers may be employed, including a non-contiguous sub-set, and the like. The elicitation may take the form of a question, a survey, a questionnaire, a task, a study, and the like. For example an elicitation may be: Do you want your Mobile device to be able to automatically download your chosen music supply to your car audio system and set the sound at the right level for your listening pleasure?

Processing continues to block 506 where the elicitation is sent to the customer, potential customer, user, and the like, determined at block 502. Transitioning to block 508, a response to the elicitation is received from the customer, potential customer, user, and the like. For example the potential customer might respond: Yes and I would like the menu of songs and melodies that I have in my Mobile device to be accessible to me on my car dashboard or car sound system screen for my interactive use.

Process 500 flows next to decision block 510, where a determination is made based, in part, on the response to the elicitation, as to whether to determine another elicitation. Such determination may include determining whether the response is complete, understandable, can be employed in performing a next step in a predetermined design methodology, and the like. If another elicitation is to be determined, processing loops back to block 504; otherwise, processing continues to block 512. For example:

New elicitation: does your automobile have a Bluetooth or infrared connection? If not, are you contemplating buying one with a connection like that?

New response: yes my car does have Bluetooth.

At block 512, a requirement is determined based on the response to the elicitation. Determination of the requirement may include documentation of the response, performing a statistical analysis on the response, and the like. Upon completion of determining the requirement, processing transitions to block 514, where the requirement is employed within a context of a pre-determined design methodology to enable the design of a human-machine interface. For example a requirement of the design is that the device have an automatic capability of discovering another Bluetooth enabled device within range, for determining that it is a sound system and for automatically downloading its music supply to that device or at least making it seamlessly accessible while providing a list of contents or a menu to the discovering device for display.

It should be clear that, although not illustrated, process 500 may include a loop back from block 512, block 514, and the like, to obtain additional requirements, without departing from the scope or spirit of the invention. Moreover, decision block 510 may be relocated above blocks 506 and 508, such that elicitations may be determined before sending them and receiving the response. In any event, upon completion of process 500, processing returns to a calling process to perform other actions.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed is as new and desired to be protected by Letters Patent of the United States is:

1. A computer-implemented method comprising:
   determining a context of a human-machine interface;
   determining an elicitation based on an application of at least a portion of a personal support infrastructure (PSI) stack to the context, wherein the PSI stack provides a determination of the elicitation based on at least one of a real-time aspect, and a virtual time aspect of the human-machine interface;
   providing the elicitation to at least one prospective user of the human-machine interface;
   receiving a response to the elicitation;
   determining a requirement based, in part, on the response to the elicitation; and
   providing the requirement to a design mechanism, wherein the requirement provides development of the human-machine interface.

2. The computer-implemented method of claim 1, wherein determining the requirement further comprises employing at least one of an Agile Requirements Model, a Requirements Triage, a Knowledge Level Process Model, and a Volere model.

3. The computer-implemented method of claim 1, wherein the elicitation further comprises at least one of a question, a task, a survey, and a questionnaire associated with the at least one portion of the PSI stack.

4. The computer-implemented method of claim 1, wherein providing the requirement to the design mechanism further comprises providing the requirement to at least one of a top-down, a bottom-up, an ad-hoc, a waterfall, a spiral, an evolutionary, a chaos, and an interactive design mechanism.

5. The computer-implemented method of claim 1, wherein the PSI stack further comprises a spirit layer, an identity layer, a values and beliefs layer, a thoughts and emotions layer, a talent and competence layer, a community and skills layer, an action and behaviors layer, and a technical technology layer.

6. The computer-implemented method of claim 5, wherein the technical technology layer further comprises at least one of an OSI Reference model, and an Internet TCP/IP model.

7. The computer-implemented method of claim 1, wherein application of at least a portion of the PSI stack further comprises providing a consideration of each layer within the PSI stack.

8. The computer-implemented method of claim 1, further comprising:
   receiving feedback about at least one of the requirements, the elicitation, the PSI stack, and the context; and
   employing the feedback to modify the at least one requirement, the elicitation, the PSI stack, and the context.

9. A method comprising:
   determining a context for a supportive infrastructure having a human-machine interface;
   determining, via a processor, an elicitation, in part, by applying at least a portion of a personal support infrastructure (PSI) stack to the context, wherein the PSI stack provides a determination of the elicitation based on at least one of a real-time aspect, and a virtual time aspect of the human-machine interface; and
   developing the supportive infrastructure including the human-machine interface based, in part, on a response to the elicitation.

10. The method of claim 9, wherein the PSI stack further comprises at least one of a real-time aspect, and a virtual time aspect associated with each of a spirit layer, an identity layer, a values and beliefs layer, a thoughts and emotions layer, a talent and competence layer, a community and skills layer, an action and behaviors layer, and a technical technology layer.

11. An apparatus comprising a processor configured to control:
   a Personal Support Infrastructure (PSI) manager that is configured to perform actions, including:
   determining a context of the human-machine interface;
   providing each layer within a personal support infrastructure (PSI) stack for use in determining at least one elicitation based on the context, wherein the PSI stack provides a determination of the elicitation based on at least one of a real-time aspect, and a virtual time aspect of the human-machine interface;
   providing the determined elicitation to at least one prospective user of the human-machine interface;
   receiving a response to the elicitation;

determining a requirement based, in part, on the response to the elicitation; and providing the requirement to a design mechanism, wherein the requirement provides the development of the human-machine interface.

12. The apparatus of claim 11, wherein providing the determined elicitation, further comprises providing the determined elicitation to a mobile device, and wherein receiving the response further comprises receiving the response from the mobile device.

13. The apparatus of claim 11, further comprising an elicitation store coupled to the PSI manager, configured to enable storage of the at least one elicitation.

14. The apparatus of claim 11, wherein determining at least one elicitation further comprises providing each layer within the PSI stack to be employed in determining the elicitation, and wherein at least one of an Agile Requirements Model, a Requirements Triage, a Knowledge Level Process Model, and a Volere model is employed in determining the elicitation.

15. A computer program product comprising at least one computer storage medium encoded with computer-readable program code portions, the computer-readable program code portions for use in determining a human-machine interface requirement and comprising:

a first executable portion for providing a first plurality of data fields configured to include an elicitation for provision to a user to elicit a response, the elicitation being associated with a real-time aspect including at least one of a spirit, an identity, a value and belief, a thought and emotion, a talent and competence, a community and skill, an action and behavior, and a technical technology for a prospective customer;

a second executable portion for providing a second plurality of data fields configured to include an elicitation for provision to the user to elicit a response, the elicitation being associated with a virtual-time aspect including at least one of a spirit, an identity, a value and belief, a thought and emotion, a talent and competence, a community and skill, an action and behavior, and a technical technology for a prospective customer; and a third executable portion for utilizing the elicitation associated with the real-time aspect or the elicitation associated with the virtual-time aspect in determining the human-machine interface requirement.

* * * * *

UNITED STATES PATENT AND TRADEMARK OFFICE
CERTIFICATE OF CORRECTION

PATENT NO. : 7,574,415 B2
APPLICATION NO. : 10/910909
DATED : August 11, 2009
INVENTOR(S) : Ian Browde It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 957 days.

Signed and Sealed this

Seventh Day of September, 2010

David J. Kappos
*Director of the United States Patent and Trademark Office*